United States Patent Office 3,552,855
Patented Jan. 5, 1971

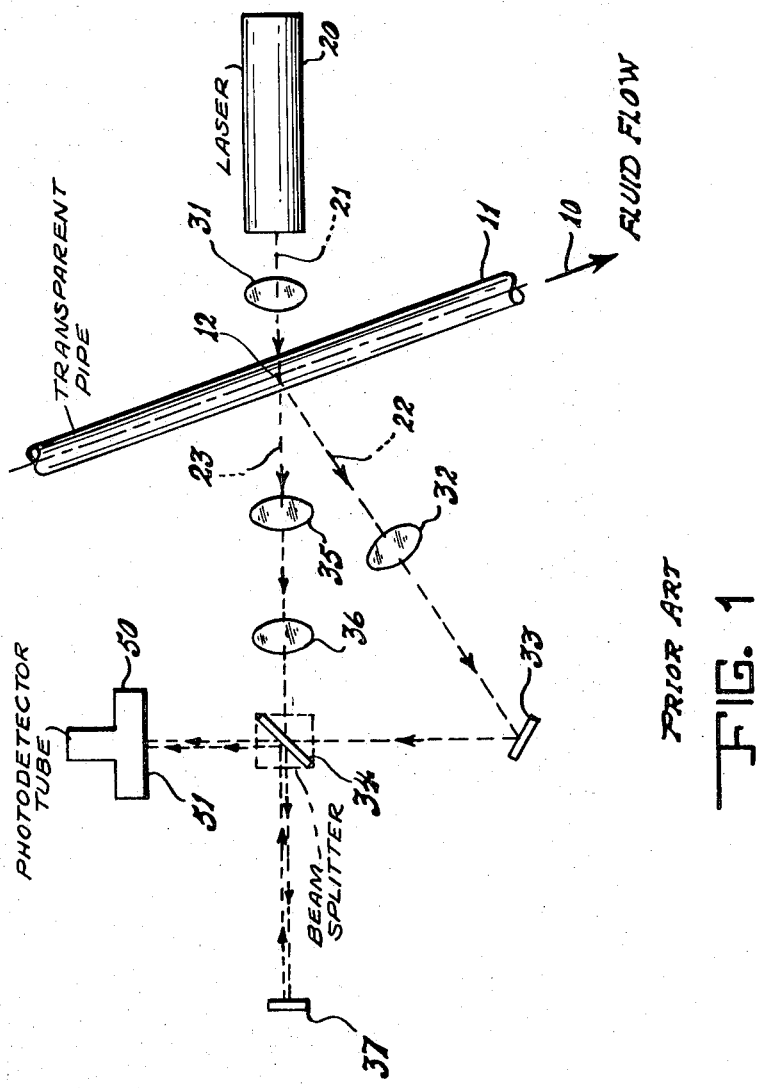

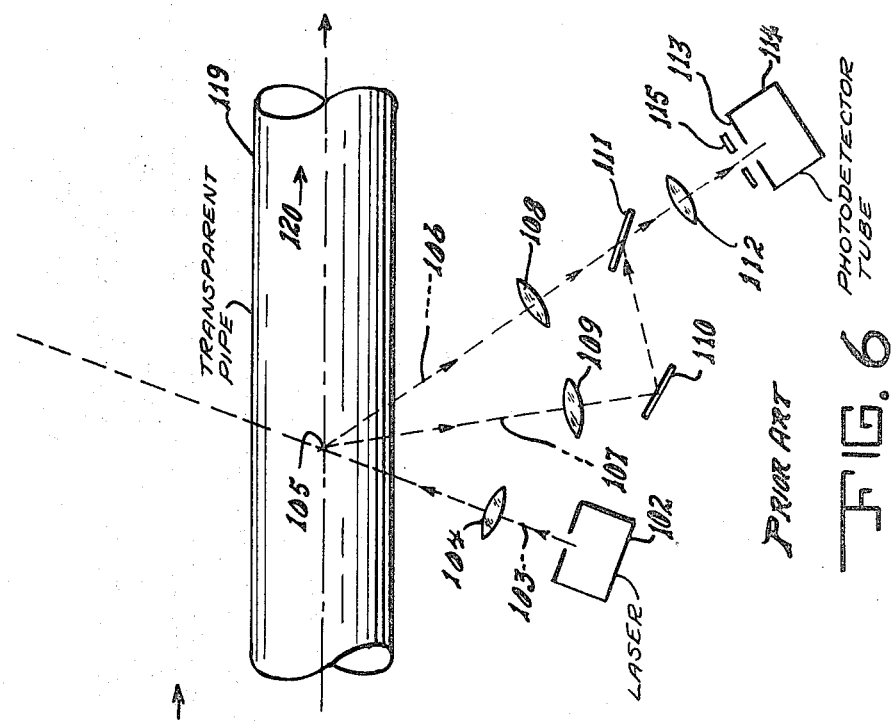
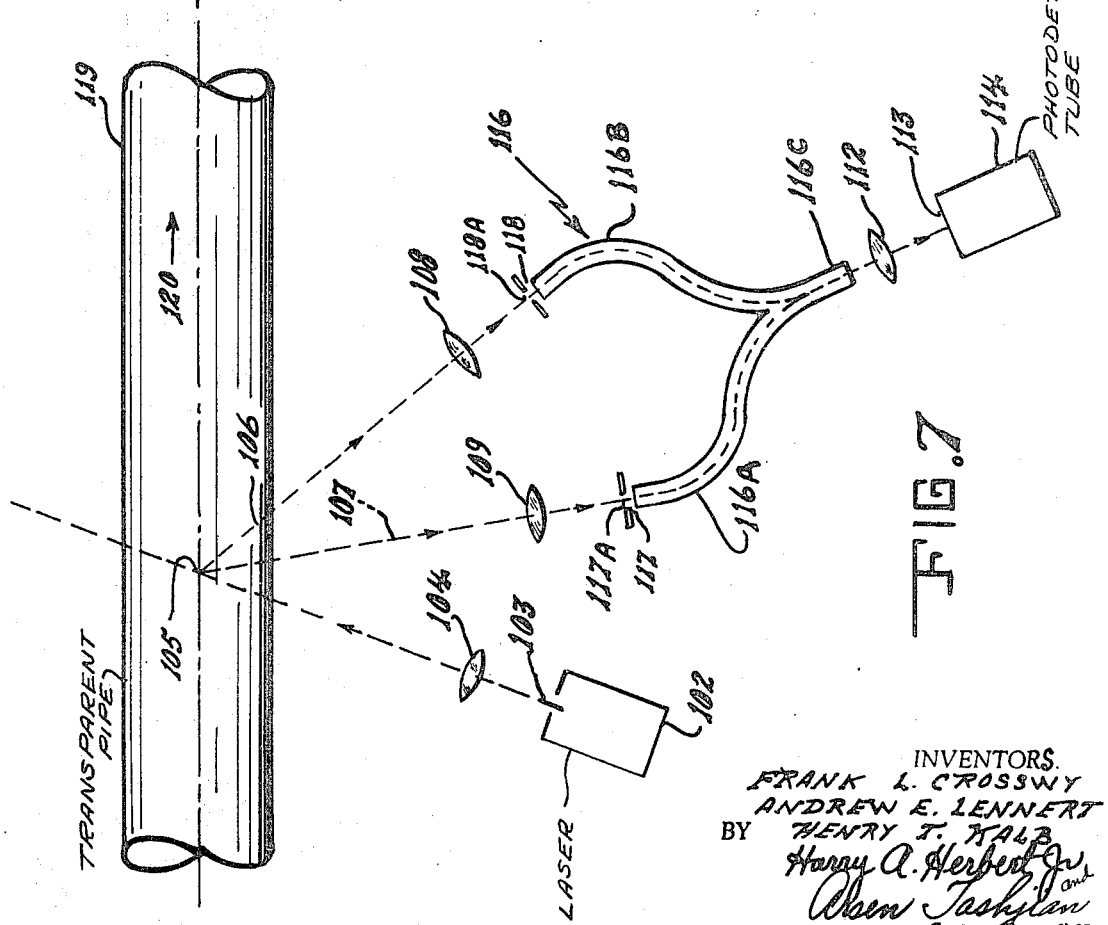

3,552,855
LASER VELOCIMETER UTILIZING FIBER OPTICS
Frank L. Crosswy and Andrew E. Lennert, Tullahoma, and Henry T. Kalb, Manchester, Tenn., assignors to the United States of America as represented by the Secretary of the Air Force
Filed Apr. 16, 1969, Ser. No. 816,705
Int. Cl. G01p 5/00
U.S. Cl. 356—28
2 Claims

ABSTRACT OF THE DISCLOSURE

A laser velocimeter comprising a laser for transmitting a light beam to a flowing fluid, which scatters a portion of the light beam; an optical system including optical fibers bundle for directing portions of the scattered and/or unscattered light beam; and a photodetector for receiving the fibers bundle output in order to obtain the flow velocity of the fluid.

BACKGROUND OF THE INVENTION

This invention relates to laser velocimeters and, more particularly, to laser velocimeters which are especially well-suited for fluid flow velocity measurements, where "fluid flow" is understood to mean either liquids or gases, or both.

Laser velocimeters, although only relatively recently in use, are not per se novel. They are the outgrowth of: the development of continuous wave (i.e., continuous beam, as distinguished from pulsed) lasers; the use of a gas, such as neon, rather than a solid, as the active material of the laser; and the refinement of the technique of optical heterodyning (i.e., optical homodyning).

A conventional laser velocimeter used for measuring the velocity of a flowing fluid basically comprises: a continuous wave coherent monochromatic light source, such as a gas laser of the helium-neon type; means for detecting light frequencies, which includes a photodetector tube with a photocathode face; and interposed therebetween an optical system for directing (i.e., collecting, focusing, transmitting reflecting and the like) light rays from the light source to the frequency detecting means.

Laser velocimeters which are used for fluid flow velocity measurement are often referred to as "Doppler-type laser velocimeters," "laser velocimeter systems," "LV," and "MAD-LV," among other descriptive or arbitrary designations. Notwithstanding what a particular laser velocimeter used for fluid flow velocity measurement may be designated or referred to in a particular instance, it may be accurately stated that there are only three basic types of such laser velocimeters and that the three types differ essentially only as to the geometric arrangement, number, and type of the optical components of the optical system. Each of the three basic types of such laser velocimeters will be described and discussed at a later point. However, it is important to note at this time that neither type, nor any modification of any type, makes use of fiber optics in the optical system. Our invention does.

The basic principle of operation of a laser velocimeter when used to measure the velocity of a fluid flow is, in summary, as follows:

The radiation, i.e., the coherent monochromatic light beam, emitted by the laser is focused at a point in the flowing fluid. This point is referred to in the art, variously, as "the scattering point" and "the velocity measurement point." The fluid is flowing in a transparent pipe. In one embodiment of the basic types, because of the geometric arrangement, the number, and the type of optical components of the optical system, a portion of the laser beam remains unscattered after striking the flowing fluid at the scattering point. This portion of the laser beam is referred to in the art as "the unscattered beam" and "the incident beam." The other portion of the laser beam, referred to in the art as "the scattered beam," is, in fact, scattered through the flowing fluid at the scattering point at an angle to the direction of the incident beam with a resultant change in frequency from the incident beam, i.e., shift caused by the optical Doppler effect. Both the incident beam and the scattered beam are made to impinge, by the components of the optical system, at the same point on the photocathode input face of the photodetector tube component of the light frequency detecting means. At the photodetector tube component of the light frequency detecting means. At the photocathode input face the frequency of the incident beam and the frequency of the scattered beam are optically homodyned, and the difference in frequency, i.e., the optical Doppler frequency, is detected by the light frequency detecting means.

In another embodiment of the basic types, the radiation, i.e., the coherent monochromatic light beam, emitted by the laser is focused at a point in the flowing fluid. The geometrical arrangement of the optical system is such that two scattered beams scattered through the flowing fluid at the scattering point are made to impinge, by the components of the optical system at the same point upon the photocathode input face of the photodetector tube component of the light frequency detecting means. At the photocathode input face, the frequency of the two scattered beams are optically homodyned and the difference in frequency, i.e., the optical Doppler frequency is detected by the light frequency detecting system.

It has been shown, both analytically and experimentally, that the optical Doppler frequency detected is proportional to the velocity of the fluid which is flowing at the scattering point.

The major problems encountered in using present state-of-the-art laser velocimeters for fluid flow velocity measurements are twofold. Firstly, there is an inability of the optical system to produce consistently a scattered beam which is intense enough to result in a difference frequency with the incident beam to result in a relatively large signal-to-noise ratio. In other words, the scattered beam, in being directed to the photocathode face of the photodetector tube, is of extremely low intensity and so widely dispersed with a resultant relatively low signal-to-noise ratio, with the signal portion not being easily detectable by the conventional photodetector tube. Secondly, there is an inability of the optical system to effectuate consistently the necessary path coincidence of the incident beam and scattered beam or two scattered beams prior to impingement, so that at impingement on the photocathode face of the photodetector tube the point of impingement for each beam will be the same. In other words, there is difficulty in making the beams impinge at the same point on the photocathode face.

The principal single cause of each of the two major problems is the inherent nature, number and arrangement of the individual components of the optical system and their necessary alignment, which is sometimes difficult but always tedious and, therefore, human-error inducing. Additionally, the problems are aggravated if there is any vibration of any of the individual optical components. Further, if a velocity profile is desired, movement of individual optical components is necessary for each and every point selected across the flow. If the fluid flow conduit is of an irregular geometric configuration and a velocity profile is desired, the problem obviously becomes more complex.

Our invention eliminates or otherwise solves these problems, and, thus, it constitutes an advance over the prior art.

SUMMARY OF THE INVENTION

This invention relates to an apparatus for measuring fluid flow velocity, and more particularly to a laser velocimeter.

One object of this invention is to provide a novel laser velocimeter for measuring the velocity of a flowing fluid.

Another object of this invention is to provide an optical system in a laser velocimeter which is capable of consistly directing (i.e., collecting, focusing, transmitting, reflecting and the like) the scattered beam or beams to the photocathode face of the photodetector tube component of the ligth frequency detecting means of a laser velocimeter without undue dispersion.

Still another object of the invention is to provide an optical system in a laser velocimeter which effectively and consistently provides for coincidence of the paths of the scattered beam and of the incident beam, or two scattered beams, prior to the impingement of said beams upon the photocathode face of the photodetector tube, so that impingement of the scattered beam and of the incident beam, or the two scattered beams, will be at the same point on the photocathode face.

A further object of this invention is the reduction of the number of optical components in the optical system of a laser velocimeter.

A still further object of this invention is to provide an optical system in a laser velocimeter in which the vibration of the optical components is eliminated or at the very least is minimized.

Yet another object is to provide an optical system for a laser velocimeter used for measuring fluid flow velocity wherein, if a velocity profile across the flow of a stationary fluid flow system is desired, the movement of individual optical components is minimized.

These and still other objects of this invention will become readily apparent after a consideration of the description of the invention and reference to the drawings.

DESCRIPTION OF THE DRAWINGS

FIG. 1 is a plan view in schematic form of one type of a conventional laser velocimeter used to measure the velocity of a flowing fluid;

FIG. 6 is a plan view in schematic form of still another type of a conventional laser velocimeter used to measure the velocity of a flowing fluid; and FIG. 7 is a plan view in schematic form of still another preferred embodiment of our invention.

DESCRIPTION OF THE PREFERRED EMBODIMENTS

Figure 2:
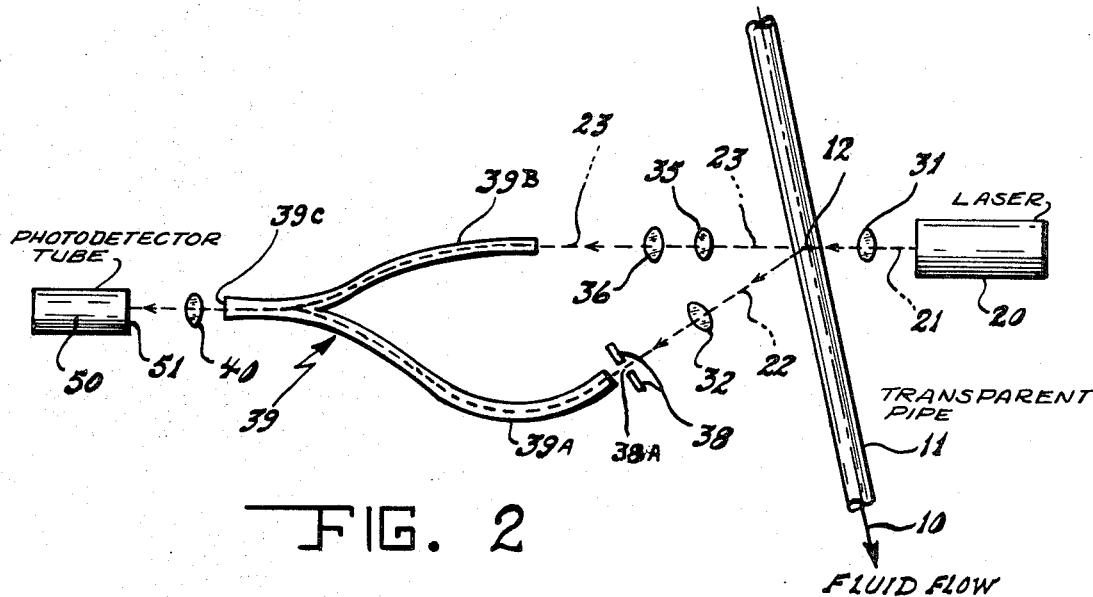
FIG. 2 is a plan view in schematic form of one preferred embodiment of our invention.

As a preliminary matter, and with reference to FIGS. 1 through 7, it is to be noted that a Doppler shifted frequency detecting means as such is not shown. Rather for simplicity only, the photodetector tube component (50, FIGS. 1, 2 and 3; 100, FIGS. 4 and 5; and 114, FIGS. 6 and 7) with photocathode input face (51, FIGS. 1, 2 and 3; 101, FIGS. 4, and 5; and 113, FIGS. 6 and 7) is shown. Aside from the photodetector tube component, conventional Doppler shifted frequency detecting means include, as components, a wideband amplifier in series with the output of the photodetector tube, a hi-pass filter in series with the output of the wideband amplifier, and a frequency meter. The structure of an alternative Doppler shifted frequency detecting means may include, aside from the photodetector tube component, a wideband amplifier in series with the output of the photodetector tube component, a wideband amplifier in series with the output of the photodetector tube and a spectrum analyzer in series with the output of the wideband amplifier.

With reference to FIG. 1, there is depicted in schematic form one type, the "LV" type, i.e., laser velocimeter type, of a conventional prior art laser velocimeter used to measure the velocity of a flowing fluid. Such a laser velocimeter includes either a continuous wave or pulsed coherent monochromatic light source, such as laser 20 which may be of, but is not limited to, the helium-neon gas type; a light frequency detecting means (not shown), having a photodetector tube 50 with photocathode input face 51; and interposed therebetween an optical system including numerous optical components (i.e., focusing lenses 31, 32 and 35; mirrors 33 and 37; neutral density filter 36; and beam splitter 34) which are suitably positioned to direct (i.e., collect, focus, transmit, reflect and the like) the laser-emitted light beam 21, and portions thereof (i.e., incident beam 23 and scattered beam 22), from laser 20 to photocathode input face 51 of photodetector tube 50.

With reference to FIG. 2, therein is shown in schematic form an embodiment of our invention which advances the present state-of-the-art, as such state is exemplified by the conventional laser velocimeter depicted in FIG. 1. From an examination of FIG. 2, and a comparison with FIG. 1, in both of which the same or similar components have like reference characters, it can be readily ascertained that we have eliminated beam splitters 34, FIG. 1, and mirrors 33 and 37, FIG. 1, which are relatively high-loss optical components. We use, as can be seen in FIG. 2, a fiber optics subsystem within the optical system, including: integrated optical fibers bundle 39 with output 39C and branches 39A and 39B; a focusing lens 40 disposed between output 39C of integrated optical fibers bundle 39 and the photocathode input face 51 of photodetector tube 50; and an optical slit or aperture 38 with opening 38A at the input of optical fiber branch 39A.

Figure 3:
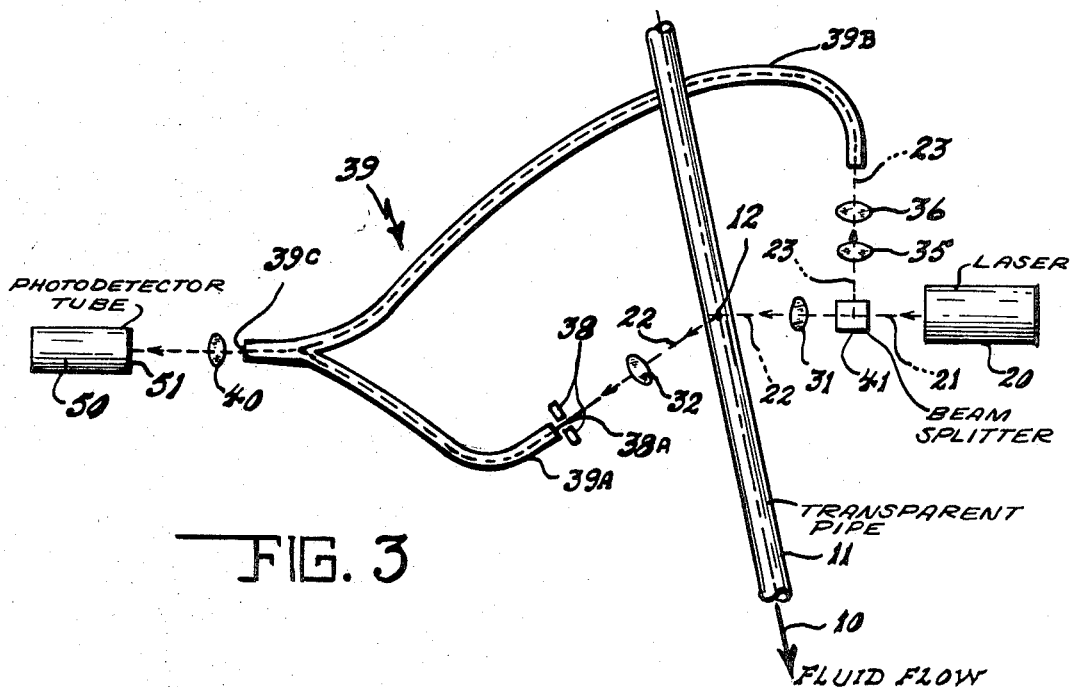
FIG. 3 is a plan view in schematic form of another preferred embodiment of our invention.

With reference to FIG. 3, therein is shown in schematic form, another embodiment of our invention which also advances the present state-of-the-art, as such state is exemplified by the conventional laser velocimeter depicted in FIG. 1. From an examination of FIG. 3 and a comparison with FIGS. 1 and 2, in all three of which the same or similar components have like reference characters, it can be also readily ascertained that we have not only eliminated beam splitter 34, FIG. 1, and mirrors 33 and 37, FIG. 1, but also have reoriented and redirected optical fibers branch 39B, so that the incident beam or unscattered beam 23 does not pass through the flowing fluid. As can be easily appreciated, this embodiment is exceptionally well-suited when the fluid flow conduit is of an irregular geometric configuration, although as a matter of convenience the conduit 11 in FIG. 3 is not of an irregular geometric configuration.

Figure 4:
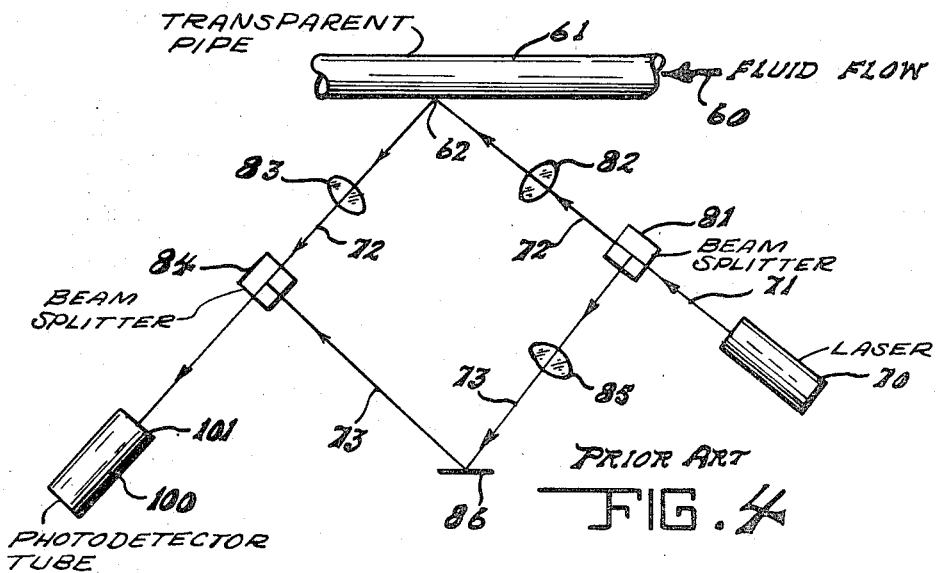
FIG. 4 is a plan view in schematic form of another type of a conventional laser velocimeter used to measure the velocity of a flowing fluid.

With reference to FIG. 4, therein is shown in schematic form another type, the "MAD-LV" type, i.e., minimum angle difference laser velocimeter type, of conventional prior art laser velocimeter used to measure the velocity of a flowing fluid. This type of laser velocimeter includes a continuous wave coherent monochromatic light source, such as laser 70 which may be of, but is not limited to, the helium-neon gas type; a Doppler shifted frequency detecting means (not shown), having a photodetector tube 100 with photocathode input face 101; and interposed therebetween an optical system, including numerous optical components (i.e., focusing lenses 82, 83 and 85; beam splitters 81 and 84; and mirror 86) which are suitably positioned to direct (i.e., collect, focus, transmit, reflect and the like) the laser-emitted light beam 71, and portions thereof (i.e., incident beam 73 and scattered beam 72), from laser 70 to photocathode input face 101 of photodetector tube 100.

Figure 5:
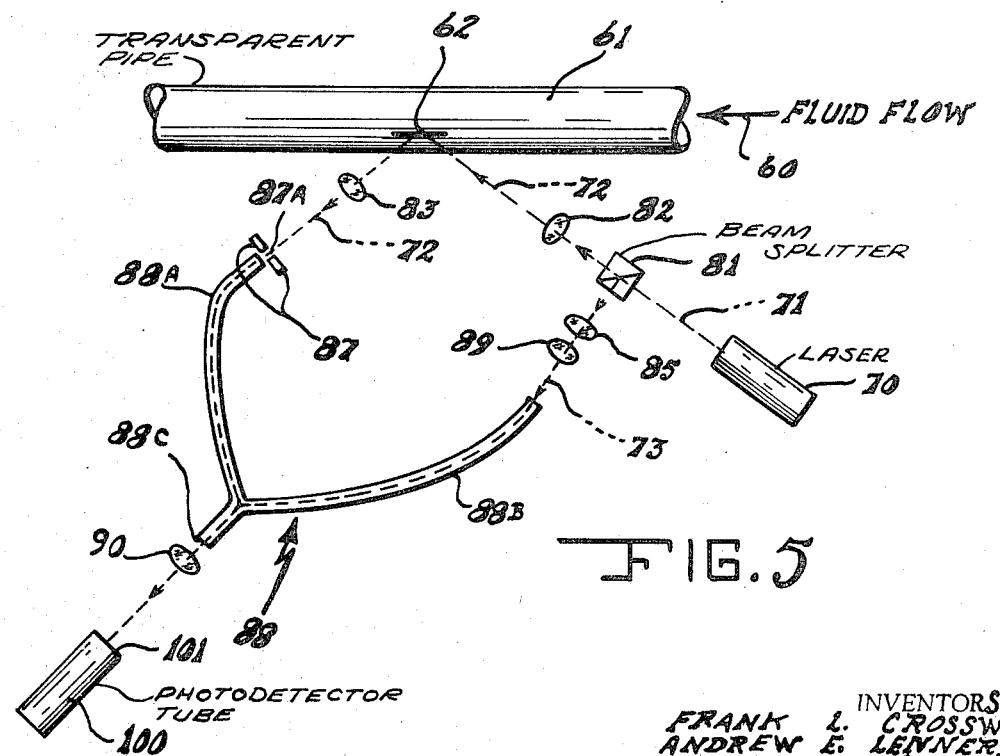
FIG. 5 is a plan view in schematic form of still another preferred embodiment of our invention.

With reference to FIG. 5, therein is shown in schematic form another embodiment of our invention which advances the present state-of-the-art, as such state is exemplified by the conventional laser velocimeter of the type depicted in FIG. 4. From an examination of FIG. 5, and a comparison with FIG. 4, in both of which the same or similar components have like reference characters, it can be readily ascertained that we have eliminated beam splitters 81 and 84 and mirror 86, which are relatively high-loss optical components. We use, as can be seen in FIG. 5, a fiber optics subsystem within the optical system, including: integrated optical fibers bundle 88 with the output 88C and branches 88A and 88B; a focusing lens 90 disposed between output 88C of integrated optical fibers bundle 88 and the photocathode input face 101 of photodetector tube 100; and optical slit or aperture 87 with opening 87A; fibers branch 88A; and a neutral density filter 89 at the input of optical fibers branch 88B.

With reference to FIG. 6, there is shown in schematic form still another type, a backscattering type, of laser velocimeter of conventional prior art used to measure the velocity of the flowing fluid. Such a laser velocimeter includes a coherent monochromatic light source, either a continuous wave or a suitable pulse laser system 102, which may be of, but is not limited to, the helium-neon gas type; a light frequency detecting means (not shown), having a photodetector tube 114 with photocathode input face 113; and interposed therebetween an optical system including numerous optical components (i.e., focusing lenses 104, 108, 109 and 112; mirror 110; beam splitter 111; and aperture 115) which are suitably positioned to direct (i.e., collect, focus, transmit, reflect, and the like) the laser emitted light beam 103 and portions thereof (i.e., scattered beams 108 and 109), from laser 102 to photocathode input face 113 of photodetector 114.

With reference to FIG. 7, there is shown in schematic form another embodiment of our invention which advances the present state-of-the-art, as such state is exemplified by the conventional laser velocimeter of the type depicted in FIG. 6. From an examination of FIG. 7, and a comparison with FIG. 6, in both of which the same or similar components have like reference characters, it can be readily ascertained that we have eliminated mirror 110 and beam splitter 111, which are relatively high-loss optical components. We use, as can be seen in FIG. 7, a fiber optics subsystem within the optical system, including: integrated optical fibers bundle 116 with output 116C and branches 116A and 116B; a focusing lens 112 disposed between output 116C of integrated optical fibers bundle 116 and the photocathode input face 113 of photodetector tube 114; two optical slits or apertures 117 and 118 with opening 117A and 118A respectively at the input of optical fibers branches 116A and 116B.

MODE OF OPERATION OF THE PREFERRED EMBODIMENTS

The mode of operation of each of our preferred embodiments of the invention is easily understood from the description which follows, coupled with an examination of FIGS. 2, 3, 5, and 7.

In FIG. 2 is shown a preferred embodiment of an "LV" type, i.e., laser velocimeter type, embodiment of our invention. A coherent monochromatic light beam 21 is emitted by continuous wave laser 20. Beam 21 is focused by lens 31, the optical axis of which is coincident with the longitudinal axis of beam 21, to scattering point 12 of fluid 10 flowing in transparent pipe of conduit 11.

A portion 23 of beam 21 remains unscattered after striking flowing fluid 10 at scattering point 12. This unscattered portion, i.e., incident beam 23, passed through flowing fluid 11 and transparent pipe 10, and impinges upon lens 35, the optical axis of which is coincident with the longitudinal axis of beam 23. Lens 25 focuses beam 23 on to neutral density filter 36, the optical axis of which is coincident with the optical axis of lens 35 and the longitudinal axis of beam 23. Neutral density filter 36 attenuates and transmits beam 23. Input face of optical fibers bundle branch 39B receives and transmits attenuated beam 23 to integrated optical fibers bundle 39, from the output 39C of which beam 23 is transmitted and made to impinge upon lens 40, the optical axis of which is coincident with the longitudinal axis of beam 23. Lens 40 focuses beam 23 on to the photocathode input face 51 of photodetector tube component 50 of the frequency detecting means (not shown).

The other portion 22 of beam 21 is scattered at point 12 through an angle to the direction of incident beam 23, with a resultant change in frequency (i.e., shift caused by the optical Doppler effect), as compared to the frequency of incident beam 23. Scattered beam 22 then impinges upon lens 32, the optical axis of which is coincident with the longitudinal axis of beam 22. Lens 32 focuses beam 22 so that beam 22 is made to pass through the opening 38A provided by optical slit or aperture slit or aperture 38. Scattered beam 22 then impinges upon the input face of optical fibers bundle branch 39A, which transmits it to integrated optical fibers bundle 39, from the output 39C of which beam 22 is transmitted and made to impinge upon lens 40, the optical axis of which is coincident with the longitudinal axis of beam 22. Lens 40 focuses beam 22 on to the photocathode input face 51 of photomultiplier tube component 50 of the light frequency detecting means (not shown).

It is to be noted that incident beam 23 and scattered beam 22 have coincident paths from output face 39C of integrated optical fibers bundle 39 to photocathode input face 51 of photodetector tube 50; and beam 22 and 23 impinge at the same point of the photocathode input face 51, where their respective different frequencies are optically homodyned and the optical Doppler frequency is detected by the frequency detecting means (not shown), of which the photodetector tube 50 is a component.

In FIG. 3 is shown another preferred embodiment of our invention. This embodiment is also of the "LV" type and is exceptionally well suited for fluid flow velocity measurements when the fluid flow conduit is irregular in geometric configuration. However, in the interest of simplification, conduit 11, FIG. 3, is shown as a transparent pipe of regular geometric configuration.

Coherent monochromatic light beam 21 is emitted by continuous or pulsed wave laser 20 and impinges upon beam splitter 41, which transmits a portion 22 of beam 21 and rotates 90 degrees the other portion 23 of beam 21. Beam 22 impinges upon lens 31, the optical axis of which is coincident with the longitudinal axis of beam 22. Lens 31 focuses beam 22 to scattering point 12 of fluid 10 flowing in transparent pipe or conduit 11. As a result, beam 22 is scattered at point 12 and its frequency is changed because of the shift caused by the optical Doppler effect. Scattered beam 22 then impinges upon lens 32, the optical axis of which is coincident with the longitudinal axis of beam 22. Lens 32 focuses beam 22 so that beam 22 passes through opening 38A provided by optical slit or aperture 38. Scattered beam 22 then impinges upon the input face of optical fibers bundle branch 39A which transmits it to integrated optical fibers bundle 39, from the output 39C of which beam 22 is transmitted and made to impinge upon lens 40, the optical axis of which is coincident with the longitudinal axis of beam 22. Lens 40 focuses beam 22 on to the photocathode input face 51 of the photomultiplier tube component 50 of the light frequency detecting means (not shown).

The portion 23 of beam 21 which has been rotated 90 degrees, with relation to beam 21, by beam splitter 41 is made to impinge upon lens 35, the optical axis of which is coincident with the longitudinal axis of beam 23. Lens 35 focuses beam 23 on to neutral density filter 36, the optical axis of which is coincident with the optical axis of lens 35 and the longitudinal axis of beam 23. Neutral density filter 36 attenuates and transmits beam 23. Attenuated beam 23 impinges upon the input face of optical fibers bundle branch 39B, through which beam 23 is transmitted to integrated optical fibers bundle 39, from the output 39C of which beam 23 is transmitted and made to impinge upon lens 40, the optical axis of which is coincident with the longitudinal axis of beam 23. Lens 40 focuses beam 23 on to the photocathode input face 51 of the photodetector tube component 50 of the Doppler shifted frequency detecting means (not shown).

It is to be noted, as to this embodiment, that beam 23 does not pass through fluid flow 10 and conduit 11; that incident beam 23 and scattered beam 22 have coincident paths from output face 39C of integrated optical fibers bundle 39 to photocathode input face 51 of photodetector tube 50; and that beams 22 and 23 impinge at the same point of photocathode input face 51, where their respective different frequencies are optically homodyned and the optical Doppler frequency is detected by the frequency detecting means (not shown), of which the photodetector tube 50 is a component.

In FIG. 5 is shown another preferred embodiment of our invention. This embodiment is of the "MAD–LV" type, i.e., minimum angle difference laser velocimeter.

Coherent monochromatic light beam 71 is emitted by continuous wave laser 70 and impinges upon beam splitter 81. There, a portion 72 of beam 71 is transmitted through, while the other portion 73 is rotated 90 degrees. Transmitted portion 72 impinges upon lens 82, the optical axis of which is coincident with the longitudinal axis of beam 72 which focuses beam 72 so as to strike fluid flow 60 in transparent pipe 61 at point 62. Beam 72 is scattered at point 62 and as a result its frequency is changed (i.e., shift caused by the optical Doppler effect). Scattered beam 72 then impinges upon lens 83, the optical axis of which is coincident with the longitudinal axis of beam 72, and is focused by said lens 83 so as to pass through opening 87A of optical slit or aperture 87. Scattered beam 72 then impinges upon the input face of optical fibers bundle branch 88A which transmits beam 72 to integrated optical fibers bundle 88, from which it is emitted at output 88C of bundle 88 and impinges upon lens 90, the optical axis of which is coincident with the longitudinal axis of said beam 72. Lens 90 focuses beam 72 upon photocathode input face 101 of photocathode 100 component of the light frequency detecting means (not shown).

Rotated and unscattered beam 73 impinges upon lens 85 whose optical axis is coincident with the longitudinal axis of beam 73. Lens 85 focuses beam 73 upon neutral density filter 89, whose optical axis is coincident with the optical axis of lens 85 and longitudinal axis of beam 73. Neutral density filter 89 attenuates and transmits beam 73, which then impinges upon the input face of optical fibers bundle branch 88B. Beam 73 is then transmitted by branch 88B to integrated optical fibers bundle and emerges from the output face 88C of bundle 88 to impinge upon lens 90, whose optical axis is coincident with the longitudinal axis of beam 73. Lens 90 focuses beam 73 upon the photocathode face 101 of the photodetector tube component 100 of the frequency detecting means (not shown).

It is to be noted, as to this embodiment, that scattered beam 72 and unscattered beam 73 have coincident paths from the output face 88C of integrated optical fibers bundle 88 to photocathode input face 101 of photodetector tube 100; and beams 72 and 73 impinge at the same point on photocathode input face 101, where the different frequencies of the beams are optically homodyned and the optical Doppler frequency is detected by the frequency detecting means (not shown), of which the photodetector tube 100 is a component.

In FIG. 7 is shown still another preferred embodiment of our invention.

Coherent monochromatic light beam 103 is emitted by either a continuous wave laser, or a suitable pulsed laser 102, and impinges upon the focusing lens 104. There, the beam 103 is focused by lens 104 so as to strike fluid flow 120 in transparent pipe 119 at point 105. Beam 103 is scattered at point 105 and as a result, its frequency is changed (i.e., shift caused by the optical Doppler effect).

Scattered beams 106 and 107 then impinge upon lenses 108 and 109, respectively, the optical axes of which are coincident with the longitudinal axis of beams 106 and 107, and are focused by said lenses so as to pass through openings 118A and 117A, respectively, of optical slit or apertures 117 and 118, respectively. Scattered beam 106 then impinges upon the input face of optical fibers bundle branch 116B, from which it is emitted at output 116C of bundle 116 and impinges upon lens 112, the optical axis of which is coincident with the longitudinal axis of said beam 106. Scattered beam 107 then impinges upon lens 109, the optical axis of which is coincident with the longitudinal axis of beam 107 and is focused by said lens 109 so as to pass through opening 118A of optical slit or aperture 118. Scattered beam 107 then impinges upon the input face of optical fiber bundle branch 116A, from which it is emitted at output 116C of bundle 116 and impinges upon lens 12, the optical axis of which is coincident with the longitudinal axis of said beam 107. Lens 112 focuses scattered beams 106 and 107 upon the photocathode input face 113 of photocathode 114 component of the frequency detecting means (not shown).

It is to be noted as to this embodiment, that the scattered beams, 106 and 107, have coincident paths from the output face 116C of the integrated optical fibers bundle 116 to photocathode input face 113 of photodetecting tube 114; and beams 106 and 107 impinge at the same point of the photocathode input face 113, where the different Doppler shifted frequencies of both beams are optically homodyned and the net resultant optical Doppler frequency is detected by the frequency detecting means (not shown), of which the photodetector tube 114 is a component.

While there has been shown and described the fundamental features of our invention, with regard to preferred embodiment and with reference to a particular application (i.e., fluid flow velocity measurement), it is to be understood that various substitutions and omissions may be made by those skilled in the art without departing from the spirit of the invention. For example, the continuous wave coherent monochromatic light source could be a molecular-gas type laser, such as an argon laser, rather than the conventionally used gas laser, such as the helium-neon type; and a pulsed laser having the proper coherence length could be substituted for the continuous wave coherent monochromatic light source.

What we claim is:

1. A velocimeter, for measuring the velocity of a fluid flowing in a transparent conduit, comprising, in combination:
   (a) means for emitting a continuous wave coherent monochromatic light beam;
   (b) means for causing said emitted light beam to impinge upon a point in the flowing fluid, resulting in a scattered portion and an unscattered portion of said emitted light beam having different light frequencies;
   (c) means for detecting differences in light frequencies;
   (d) and means for directing said scattered portion of said emitted light beam from the point of scattering, and for directing said unscattered portion of said emitted light beam, to said means for detecting differences in light frequencies, wherein said means for directing includes:
      (1) an integrated optical fibers bundle, having an output face and two input faces, with an optical fibers branch leading from each input face to the integrated portion of said integrated optical fibers bundle;
      (2) a first focusing lens suitably positioned in front of one of the said input faces to collect and focus said scattered beam portion of said emitted light beam upon said input face;
      (3) an optical slit disposed between said first focusing lens and said input face, to permit the passing of said scattered beam portion of said emitted light beam;
(4) a second focusing lens suitably positioned in front of the other said input face to collect and focus said unscattered beam portion of said emitted light beam upon said other input face;
(5) a neutral density filter disposed between said second focusing lens and said other input face, with said neutral density filter and said second focusing lens having coincident optical axes;
(6) and a third focusing lens suitably positioned at said output face of said integrated optical fibers bundle, to collect and focus said scattered and unscattered light beam portions of said emitted light beam on to said means for detecting differences in light frequencies;
with the difference in frequency of said scattered portion of said emitted light beam and of said unscattered portion of said emitted light beam being proportional to the velocity of the fluid flowing at the point of scattering.

2. A velocimeter, for measuring the velocity of a fluid flowing in a transparent conduit, comprising, in combination:
(a) means for emitting a pulsed coherent monochromatic light beam;
(b) means for causing said emitted light beam to impinge upon a point in the flowing fluid, resulting in two scattered portions of said emitted light beam each having a different light frequency;
(c) means for detecting differences in light frequencies;
(d) and means for directing said two scattered portions of said emitted light beam from the point of scattering to said means for detecting differences in light frequencies, wherein said means for directing includes:
(1) an integrated optical fibers bundle, having an output face and two input faces, with an optical fibers branch leading from each input face to the integrated portion of said integrated optical fibers bundle;
(2) a first focusing lens suitably positioned in front of one of the said input faces to collect and focus one portion, of said two scattered portions, of said emitted light beam;
(3) a first optical slit disposed between said first focusing lens and said one of said two input faces, to permit the passing of said one portion, of said two scattered portions of said emitted light beam;
(4) a second focusing lens suitably positioned in front of the other of said two input faces, to collect the other portion, of said two scattered portions, of said emitted light upon said other input face;
(5) a second optical slit disposed between said second focusing lens and said other of said two input faces, to permit the passing of said other portion, of said two scattered portions, of said emitted light beam;
(6) and a third focusing lens suitably positioned at said output face of said integrated optical fibers bundle, to collect and focus said two scattered portions of said emitted light beam on to said means for detecting differences in light frequencies;
with the difference in frequency between the said two scattered portions of said emitted light beam being proportional to the velocity of the fluid flowing at the point of scattering.

References Cited

UNITED STATES PATENTS

| | | | |
|---|---|---|---|
| 3,297,875 | 1/1967 | Garwin et al. | 350—96X |
| 3,409,369 | 11/1968 | Bickel | 356—28 |
| 3,413,850 | 12/1968 | Merrifield | 356—28X |
| 3,446,558 | 5/1969 | Seaton | 356—28X |
| 3,457,000 | 7/1969 | Genahr | 350—96 |

OTHER REFERENCES

Proceedings of the IEEE, "Laser Doppler Velocimeter for Measurement of Localized Flow Velocities in Liquids," by J. W. Foreman, Jr., et al., pp. 424 and 425, March 1966.

IBM Technical Disclosure Bulletin, "Split Optics Alignment Apparatus for Microphotography," by D. J. Lasky, vol. II, No. 7, December 1968, pp. 798–799.

RICHARD A. FARLEY, Primary Examiner

M. F. HUBLER, Assistant Examiner

U.S. Cl. X.R.

350—96